United States Patent [19]

Wen et al.

[11] Patent Number: 5,115,245

[45] Date of Patent: May 19, 1992

[54] SINGLE SUBSTRATE MICROWAVE RADAR TRANSCEIVER INCLUDING FLIP-CHIP INTEGRATED CIRCUITS

[75] Inventors: Cheng P. Wen, Mission Viejo; Gregory S. Mendolia, Torrance; Mario Siracusa, Fountain Valley, all of Calif.; Joseph J. Maieron, Kokomo; William D. Higdon, Greentown, both of Ind.; John J. Wooldridge, Manhattan Beach; Jon Gulick, Hawthrone, both of Calif.

[73] Assignees: Hughes Aircraft Company, Los Angeles, Calif.; Delco Electronics Corporation, Kokomo, Ind.

[21] Appl. No.: 576,915

[22] Filed: Sep. 4, 1990

[51] Int. Cl.⁵ .............................................. H01Q 13/26
[52] U.S. Cl. ......................................... 342/175; 342/70; 343/700 MS
[58] Field of Search ........................... 342/175, 70; 343/700 MS

[56] References Cited

U.S. PATENT DOCUMENTS

| Re. 32,369 | 3/1987 | Stockton et al. | 342/368 |
|---|---|---|---|
| 4,251,817 | 2/1981 | Kimura et al. | 455/325 X |
| 4,255,730 | 3/1981 | Sekine et al. | 455/81 |
| 4,433,313 | 2/1984 | Saint et al. | 342/368 |
| 4,490,721 | 12/1984 | Stockton et al. | 342/368 |
| 4,818,963 | 4/1989 | Green | 342/372 |
| 4,823,136 | 4/1989 | Nathanson et al. | 342/368 |
| 4,870,421 | 9/1989 | Peil et al. | 342/175 |
| 4,893,126 | 1/1990 | Evans | 342/175 |
| 4,901,084 | 2/1990 | Huguenin et al. | 342/179 |
| 4,931,799 | 6/1990 | Wen et al. | 342/110 |
| 4,967,201 | 10/1990 | Rich, III | 342/175 |

Primary Examiner—John B. Sotomayor
Attorney, Agent, or Firm—Jeannette M. Walder; Terje Gudmestad; Wanda K. Denson-Low

[57] ABSTRACT

A microwave radar transceiver assembly (30) includes a monolithic microwave integrated circuit (MMIC) chip (58) having a coplanar waveguide transmssion lines (100, 102, 104) formed on the same surface (58a) as the electronic elements thereof. Coplanar waveguide transmission lines (68, 70, 72) are also formed on a surface (62a) of a substrate (62). The transceiver chip (58), in addition to other chips (56, 60), are mounted on the substrate (62) in a flip-chip arrangement, with the respective surfaces (58a, 62a) on which the transmission lines (100, 102, 104; 68, 70, 72) are formed facing each other. Electrically conductive bumps (106, 108, 110) are formed on portions of the transmission lines (100, 102, 104) of the chips (56, 58, 60) which are to be interconneced with the transmission lines (68, 70, 72) of the substrate (62), and solder (114) is formed on the portions of the transmission line (68, 70, 72) of the substrate (62) which are to be interconnected with the transmission lines (100, 102, 104) of the chips (56, 68, 60). The bumps (106, 108, 110) provide spacing between the mating surfaces (58a, 62a) of the substrate (62) and chips (56, 68, 60), and isolation between electronic elements on the chips (56, 58, 60).

12 Claims, 3 Drawing Sheets

SINGLE SUBSTRATE MICROWAVE RADAR TRANSCEIVER INCLUDING FLIP-CHIP INTEGRATED CIRCUITS

BACKGROUND OF THE INVENTION

1. Field of the Invention

The present invention relates to a single substrate, microwave radar transceiver including flip-chip mounted monolithic microwave integrated circuit (MMIC) chips for applications such as near obstacle detection systems (NODS) for automotive vehicles.

2. Description of the Related Art

Conventional MMICs are fabricated on gallium arsenide (GaAs) substrates using the microstrip line as the principal microwave signal transmission medium. A general treatise on MMIC technology and microwave transmission line configurations is found in "Millimeter-Wave Integrated Circuits", by Kai Chang, TRW-Electronics & Defense Sector/Quest, Winter 1983/84, pp. 43–59. Radar transceivers incorporating MMIC integrated circuits are desirable in numerous applications, including NODS, true ground speed sensors, obstacle avoidance systems (adaptive cruise control), and active phased array radars which utilize a large number of transceivers in a single operating unit.

The thickness of the GaAs substrate is typically limited to 100 microns at X-band and higher frequencies based on dispersion characteristics, mode conversion, thermal and circuit density considerations. These MMIC chips are too fragile for automated chip handling using modern robotic manufacturing techniques such as pick and place and die bonding. In addition, wire bonding interconnects with 25 micron diameter gold wires are generally used, which are labor intensive and lead to reliability problems. Microstrip based MMICs are not compatible with low cost flip-chip assembly technology because the ground plane is on the opposite side of the substrate from the microwave frequency electronic circuit elements.

Microstrip is the most widely used transmission line in both hybrid and monolithic microwave integrated circuits. As illustrated in FIG. 1, an electrically conductive stripline 10 is formed on one surface of an electrically insulative or dielectric substrate 12, whereas an electrically conductive electrode or ground plane 14 is formed on the opposite surface. The characteristic impedance of the microstrip transmission line is determined by the width of the stripline 10, and the thickness and dielectric constant of the substrate 12. The thickness of the substrate 12 is usually kept to a small fraction of a wavelength of the highest signal frequency propagating in the substrate 12 to avoid excess frequency dispersion or undesirable higher order mode (other than the fundamental transverse electrical and magnetic (TEM) mode) excitation at the signal frequency, or harmonics of the signal frequency. Typical GaAs based MMICs operating at X-band and higher frequencies are fabricated on 100 micron thick substrates. Access to the ground plane 14 is provided by means of a metallized vertical interconnect (via) formed in a hole extending through the substrate 12.

As illustrated in FIG. 2, a conventional MMIC hybrid microcircuit arrangement includes individual MMIC chips 16, 18 and 20 which are mounted on a common metal substrate or carrier 22 maintained at ground potential. Interconnects between the chips 16, 18 and 20 are provided by gold wires or ribbons 24 which are typically 25 microns in diameter. The interconnects 24 are often the major source of reliability problems when the chips 16, 18 and 20 are assembled into a common module with other integrated circuits. The thin (100 micron thick) chips 16, 18 and 20 are too fragile for fabrication processes using automated/robotic pick and place techniques. In addition, the microstrip based circuitry as illustrated in FIG. 1, with the ground plane 14 on the side opposite the striplines 10, is not compatible with flip-chip assembly techniques using a low cost reflow solder process.

SUMMARY OF THE INVENTION

The present invention provides a low cost method for fabricating hybrid MMIC assemblies or modules including a radar transceiver, signal processing, and power conditioning integrated circuit chips, and microwave transmit and receive patch antennas on a common substrate. All integrated circuit attachments are made during a single reflow solder process. Coplanar waveguide and/or parallel stripline circuitry is employed for the MMIC chip and substrate to facilitate the flip-chip assembly process.

This enables the production of low cost microwave transceiver module assemblies for high volume, high rate radar sensor and communication equipment manufacturing. The present invention is compatible with low cost automated/robotic hybrid circuit assembly methods because of the rugged coplanar microwave integrated circuit chips employed. The present chips may be made as thick as 600 microns or more as opposed to conventional 100 micron thick MMIC chips since the constraints imposed by microstrip transmission lines are eliminated. Costly manual chip alignment registration and interconnect wire bonding steps are eliminated during the assembly process in which many modules can be processed simultaneously.

More specifically, a microwave radar transceiver includes a monolithic microwave integrated circuit (MMIC) chip having coplanar waveguide transmission lines formed on the same surface as the electronic elements thereof. Coplanar waveguide transmission lines are also formed on a surface of a substrate. Planar transmitting and receiving antenna elements are formed on the opposite surface of the substrate, and interconnected with the transmission lines by vertical interconnects which extend through the substrate. The transceiver chip, in addition to signal processing and power conditioning chips, are mounted on the substrate in a flip-chip arrangement, with the respective surfaces on which the transmission lines are formed facing each other. Electrically conductive bumps are formed on portions of the transmission lines of the chips which are to be interconnected with the transmission lines of the substrate, and solder is formed on the portions of the transmission lines of the substrate which are to be interconnected with the transmission lines of the chips. The chips are aligned on the substrate, and the assembly is heated to fuse the solder and interconnect the bumps on the chips with the transmission lines on the substrate in an integral operation. The bumps provide spacing between the mating surfaces of the substrate and chips, and isolation between electronic elements on the chips.

These and other features and advantages of the present invention will be apparent to those skilled in the art from the following detailed description, taken together

DETAILED DESCRIPTION OF THE INVENTION

Figure 1:
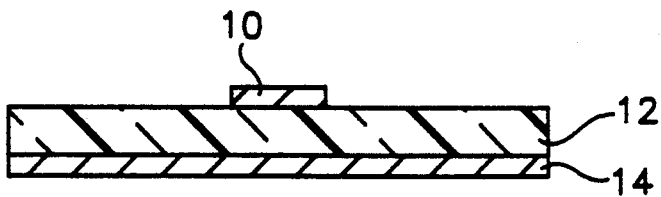
FIG. 1 is a sectional view of a conventional microstrip transmission line.
Figure 2:
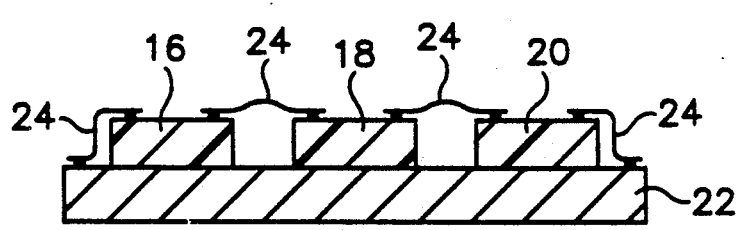
FIG. 2 is a sectional view illustrating an assembly of conventional microstrip line based MMIC chips mounted on a substrate or carrier.
Figure 3:
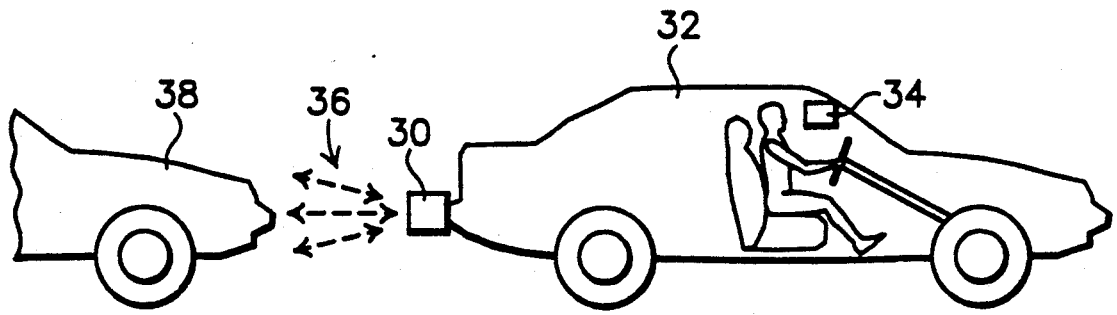
FIG. 3 is a simplified diagram illustrating a radar transceiver embodying the present invention employed as a near obstacle sensor for an automotive vehicle.

FIG. 3 illustrates a preferred application for a single substrate radar transceiver embodying the present invention, although the invention is applicable to numerous other applications. In accordance with the invention, a radar transceiver assembly or module 30 is mounted on a rear bumper or other rearwardly facing surface of an automotive vehicle 32. An aural and/or visual display 34 is mounted inside the vehicle 32 at a location where it is capable of being readily seen and/or heard by the vehicle operator. The transceiver module 30 transmits a microwave radar signal rearwardly from the vehicle 32, and receives reflections of the transmitted signal from an object or obstacle such as another vehicle 38 located near the rear of the vehicle 32 as indicated by arrows 36. In response to the reflected signals, the module 30 energizes the display 34 to notify the vehicle operator of the presence of the obstacle 38.

The arrangement illustrated in FIG. 3 is known as a near obstacle detection system (NODS), and is primarily designed to deter the operator from backing the vehicle into collision with an unseen obstacle located at the rear of the vehicle 32. Such a system is especially useful for trucks which do not have rear windows for providing a direct rear view. The system will also alert the operator to the presence of another vehicle which is approaching from the rear, and can be adapted to sense for the presence of an adjacent vehicle in a blind spot of the vehicle 32, although not illustrated. The module 30 may embody any applicable type of radar system within the scope of the present invention, such as pulsed, Doppler, etc.

The display 34 may include a blinking light, audible beeper, analog or digital distance readout, or any other type of annunciator suitable for a particular application. For a NODS mounted at the rear of an automotive vehicle as illustrated, the display 34 will typically include a blinking light and beeper, with the blink and beep rates and/or beeper volume increasing as the distance to the sensed obstacle decreases.

Figure 4:
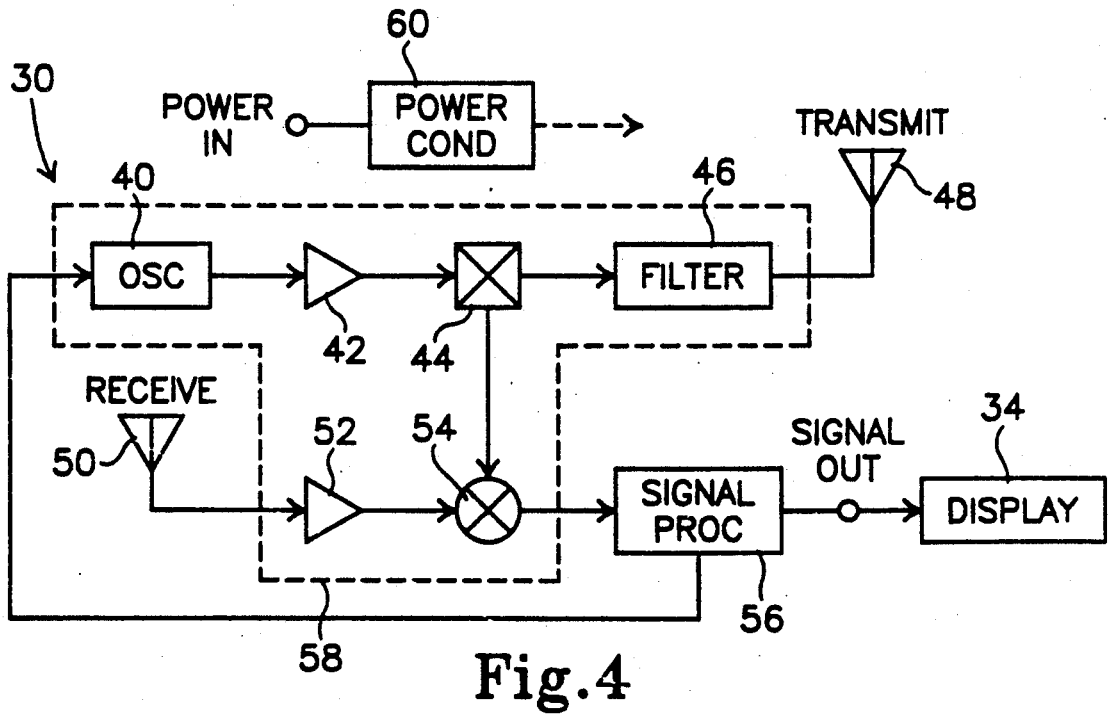
FIG. 4 is a block diagram of the near obstacle sensor shown in FIG. 3.

A block diagram of the module 30 is illustrated in FIG. 4. The module 30 includes a signal processing unit 56 which controls the waveform of a master oscillator 40. The master oscillator 40 generates an electromagnetic signal at a microwave frequency, and feeds the signal through an amplifier 42 to a splitter 44. A portion of the signal passes through the splitter 44, and is fed through a filter 46 to a transmitting antenna 48.

A reflection of the transmitted signal from an obstacle or other object illuminated by the signal from the antenna 48 is picked up by a receiving antenna 50, and fed through an amplifier 52 to a mixer 54. A portion of the transmitted signal from the splitter 44 is also fed into the mixer 54. The transmitted and received signals are fed from the mixer 54 into a signal processing unit 56 which senses the presence of an obstacle, and optionally the distance to the obstacle and relative velocity between the vehicle and obstacle, as a function of the transmitted and received signals. The output of the signal processing unit 56 is fed to the display 34.

The elements 40, 42, 44, 46, 52 and 54 are integrated into a single MMIC radar transceiver chip 58. The module 30 further includes a power conditioning unit 60 which, although not illustrated in detail, transforms and regulates an input voltage from a primary power source such as a storage battery (not shown) of the vehicle 32 to provide the various operating voltages required by the transceiver chip 58 and other components of the module 30.

Figure 5:
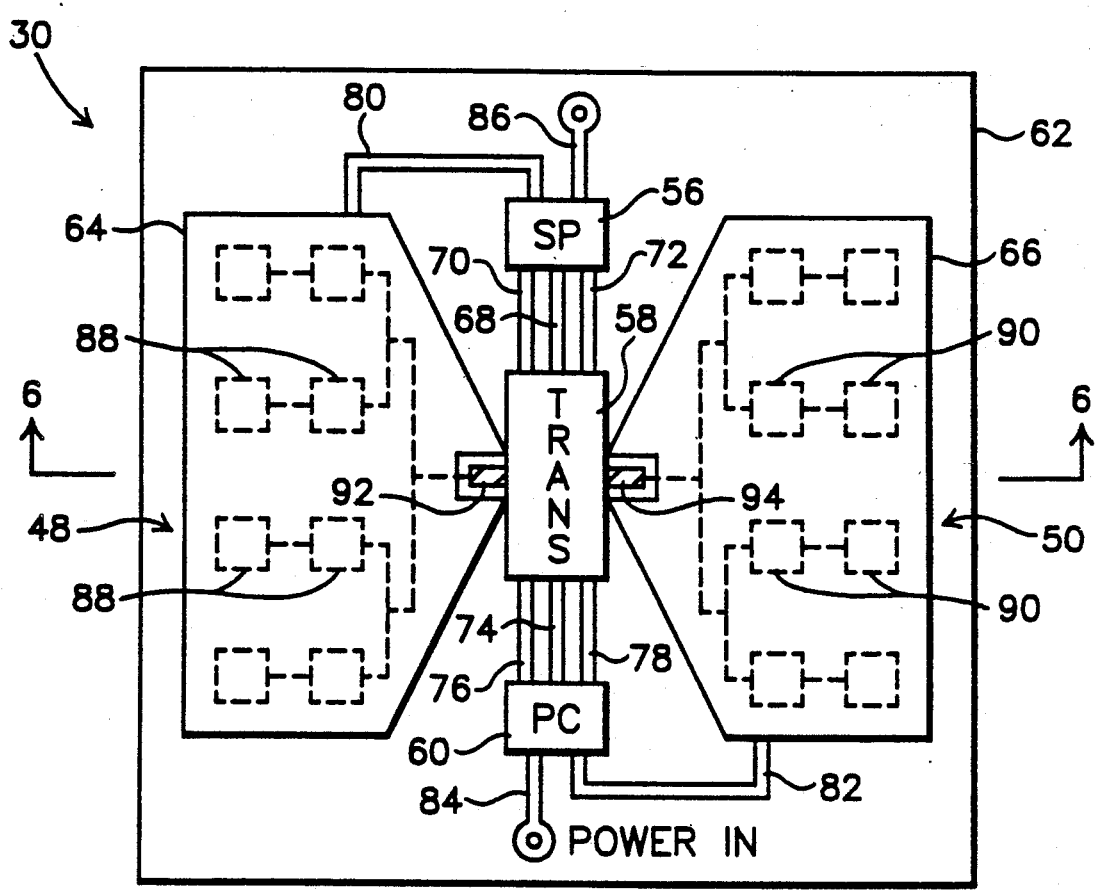
FIG. 5 is a simplified plan view of the present radar transceiver.
Figure 6:
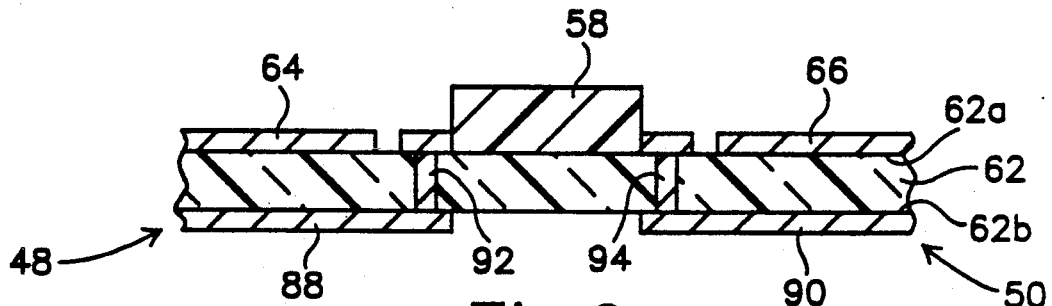
FIG. 6 is a section taken on a line 6—6 of FIG. 5.

Referring now to FIGS. 5 and 6, the present radar transceiver assembly or module 30 includes an electrically insulative substrate 62 which is typically formed of alumina and has a first surface 62a and a second surface 62b which is opposite to the first surface 62a. The MMIC transceiver chip 58 is mounted on the first surface 62a of the substrate 62 in a flip-chip arrangement as will be described in detail below. The signal processing unit 56 and power conditioning unit 60 may also be embodied as integrated circuit chips, and mounted on the substrate 62 in the same manner as the transceiver chip 58.

Referring in combination to FIGS. 5 and 6, a metalization pattern including ground planes 64 and 66 is formed on the first surface 62a of the substrate 62, in addition to coplanar microwave transmission lines which interconnect the chips 56, 58 and 60. The transmission lines may include coplanar waveguides, parallel striplines, or any other suitable configuration or combination thereof. As illustrated, a transmission line including a center or signal conductor 68, and ground conductors 70 and 72 on opposite sides of the signal conductor 68, is formed on the surface 62a for interconnecting the signal processing chip 56 with the transceiver chip 58. A similar transmission line including a center or signal conductor 74 and ground conductors 76 and 78 is formed on the surface 62a for interconnecting the power conditioning chip 60 with the transceiver chip 58. Further illustrated is a conductor 80 for connecting the signal processing chip 56 to the ground plane 64, and a conductor 82 for connecting the power conditioning chip 60 to the ground plane 66. A conductor terminal 84 is provided for connecting the power conditioning chip 62 to a primary power supply (not shown), and a conductor terminal 86 is provided for connecting the power conditioning chip 56 to the display 34.

In accordance with the present invention, the transmitting antenna 48 is provided as a microstrip patch antenna including a plurality of interconnected elements 88 formed on the second surface 62b of the substrate 62 under the ground plane 64 as viewed in FIGS. 5 and 6. The receiving antenna 50 is provided as a similar microstrip patch antenna including interconnected elements 90 formed on the second surface 62b under the ground plane 66. The ground planes 64 and 66 provide electrical ground for the chips 56, 58 and 60 on the first surface 62a of the substrate 62, as well as for the respective antenna elements 88 and 90 on the second surface 62b of the substrate 62. The output of the filter 46 which constitutes the transmitted signal output of the transceiver chip 58 is interconnected with the transmitting antenna elements 88 by an electrically conductive vertical interconnect (via) 92 which extends through a hole in the substrate 62. The input to the amplifier 52 which constitutes the received signal input of the transceiver chip 58 is interconnected with the receiving antenna elements 90 by a similar via 94.

Figure 7:
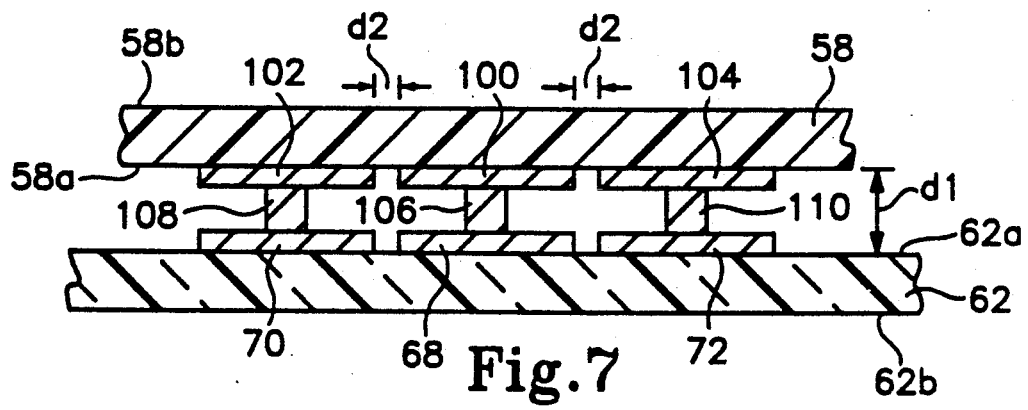
FIG. 7 is a fragmentary sectional view of the transceiver illustrating dimensions which are critical to the embodiment of the invention.

The particular architecture of the MMIC transceiver chip 58, as well as the chips 56 and 60, is not the subject matter of the present invention, except that these chips have their electronic elements (field effect transistors, etc.) interconnected by coplanar microwave transmission lines formed on the same surface as the electronic elements. As illustrated in FIG. 7, a representative portion of the transceiver chip 58 is shown as having a first surface 58a and an opposite second surface 58b. The electronic elements of the chip 58 as well as the coplanar transmission lines are formed on the first surface 58a, which mates with the first surface 62a of the substrate 62 in a flip-chip configuration. As viewed in FIG. 7, a coplanar transmission line including a center or signal conductor 100, and ground conductors 102 and 104 are formed on the first surface 58a of the chip 58, and electrically interconnected with the signal conductor 68 and ground conductors 70 and 72 on the substrate 62 by soldering as will be described in detail below. The chips 56 and 60 have transmission lines formed thereon which are essentially similar to those shown in FIG. 7. Although not illustrated, the internal electronic elements of the chips 56, 58 and 60 are interconnected by coplanar transmission lines including conductors similar to 100, 102 and 104.

An important factor in embodying the present invention is to adapt MMIC integrated circuit chips to flip-chip technology. The radio frequency characteristics of conventional microstrip or push-pull lumped-element based coplanar circuitry are strongly influenced by the dielectric substrate (or metallization) in close proximity to the microwave electronic circuit elements on the inverted MMIC chips. Isolation between different portions of a MMIC chip may also deteriorate because of additional coupling through the module substrate. These potential disadvantages are alleviated by using narrow-gap coplanar waveguide or other suitable coplanar transmission lines on the MMIC chips. As illustrated in FIG. 7, for GaAs based MMICs, no significant change in coplanar waveguide characteristic impedance or phase velocity will be encountered if the separation d1 of the surfaces 58a and 62a is at least six times the gap d2 between the signal conductor 100 and ground conductors 102 and 104. For a gap d2 of 12 microns, the separation d1 should be at least 72 microns.

As shown in FIG. 7, the required spacing between the chips 56, 58 and 60 and substrate 62 may be provided by forming electrically conductive spacers or bumps 106, 108 and 110 on the conductors 100, 102 and 104 respectively prior to assembly of the chips on the substrate 62. The bumps may be formed by silver plating, and are typically 150 microns in diameter and 75 microns in height for low frequency or grounding interconnections, and 75 microns in diameter for microwave frequency interconnections. The lower ends of the bumps 106, 108, and 110 are simultaneously soldered to the conductors 68, 70 and 72 respectively using a reflow solder process which will be described in detail below. In addition to providing electrical interconnection and spacing, the bumps serve to protect the air bridges commonly found on MMIC chips.

Figure 8:
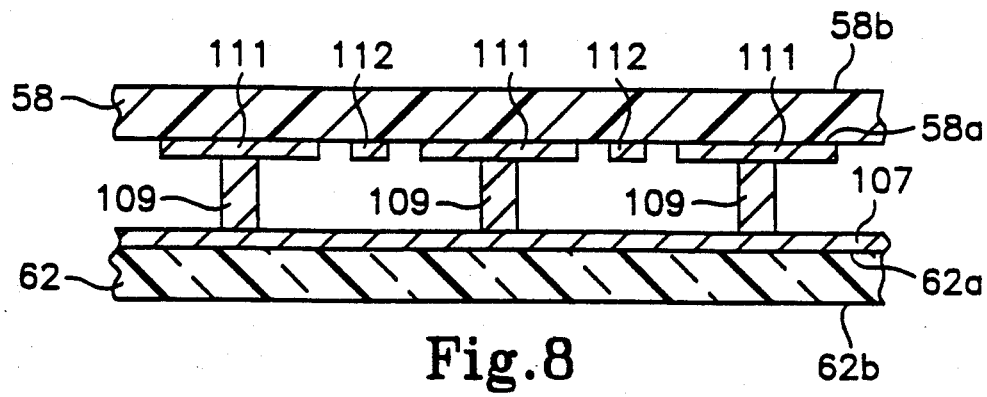
FIG. 8 is a sectional view illustrating a grounding interconnect configuration including electrically conductive spacers or bumps in accordance with the invention.

In addition to the ground conductors 70 and 72, grounded metallization patterns such as designated as 107 in FIG. 8 may be provided on the surface 62a of the substrate 62 to form, in combination with additional bumps 109, a "picket fence" of grounding interconnects to provide enhanced electrical isolation for the different portions of the assembly. The additional bumps 109 are formed on ground conductors of the chip 58 which are collectively designated as 111 in FIG. 8. Center conductors of the transmission lines are also shown and collectively designated as 112.

Figure 9:
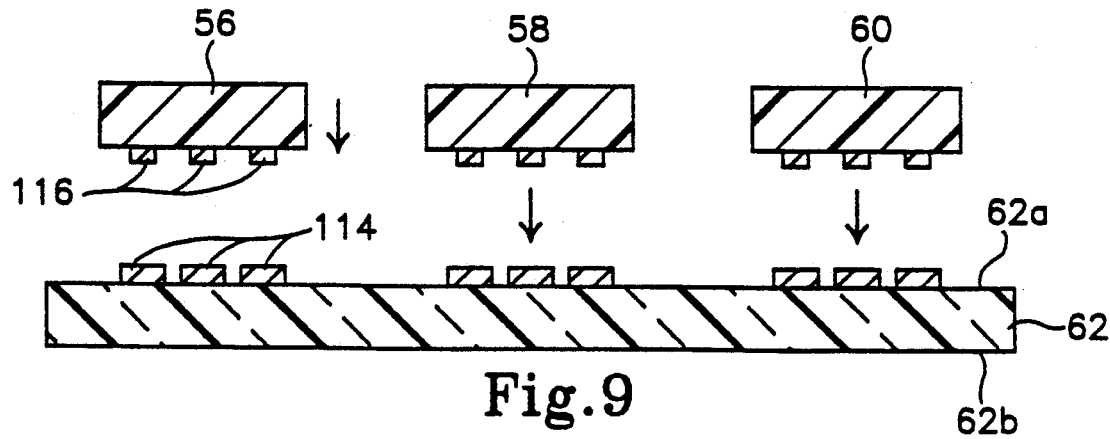
FIGS. 9 and 10 are sectional views illustrating a fabrication method of the invention.
Figure 10:
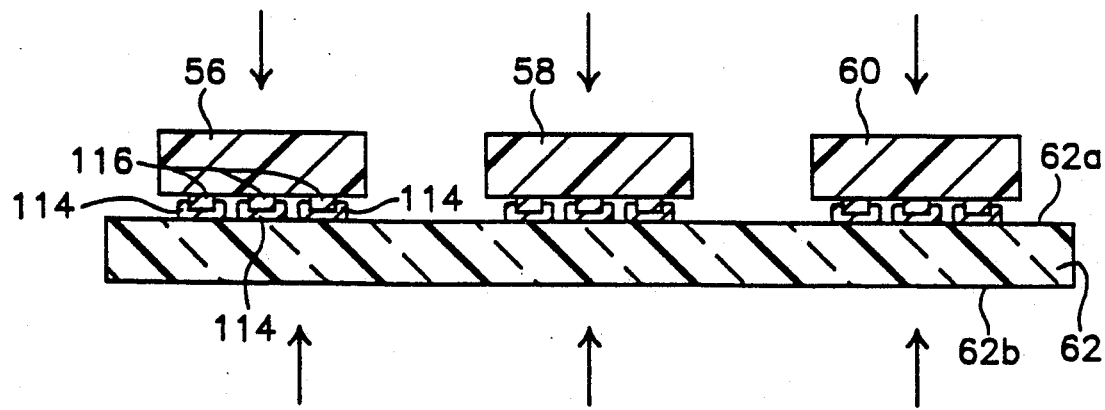

The chips 56, 58 and 60 are assembled to and electrically interconnected with the substrate 62 using a reflow soldering process as illustrated in FIGS. 9 and 10. In FIG. 9, a mixture of solder and flux paste is formed on the portions of the transmission lines of the substrate 62 which are to be interconnected with the transmission lines of the chips 56, 58 and 60 using, for example, printing through a mask. The solder pattern is collectively designated as including portions 114. Bumps, which are collectively designated as 116, are formed on the portions of the transmission lines of the chips 56, 58 and 60 which are to interconnected with the transmission lines of the substrate 62. The chips 56, 58 and 60 are mated with the substrate 62 as indicated by arrows such that the bumps 116 are precisely aligned with the solder portions 114.

As viewed in FIG. 10, the assembly is heated to a temperature of 200° to 300° C. for approximately one minute as indicated by arrows, causing the solder 114 to melt or "reflow", and fuse and thereby electrically interconnect the bumps 116 with the transmission lines on the substrate 62. The reflow solder process enables chip positioning accuracy within 25 microns, since the surface tension of the melted solder portions 114 pulls on the bumps 116. The coplanar microwave transmission lines of the MMIC chips enable the chips to be simultaneously assembled to the substrate in a flip-chip configuration using the reflow solder process. The coplanar transmission lines also enable the MMIC chips to be made much thicker than conventional GaAs MMIC chips, typically 600 microns as compared to 100 microns. This enables the present MMIC chips to be handled and assembled to the substrates using automated/robotic technology with extreme precision, eliminating the labor intensive manual operations and high damage rates associated with the prior art.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. A microwave radar assembly, comprising:
an electrically insulative substrate having a surface;
coplanar microwave transmission line means formed on said surface of the substrate;
a microwave radar integrated circuit chip having a surface; and
coplanar microwave transmission line means formed on said surface of the radar chip;
the radar chip being mounted on the substrate with said surface of the radar chip facing said surface of the substrate, wherein portions of the transmission line means of the substrate to be interconnected with respective portions of the transmission line means of the radar chip are aligned with each other, and the transmission line means of the radar chip being electrically interconnected with the transmission line means of the substrate, wherein solder is formed on said portions of the transmission line means of the substrate and is fused with said respective portions of the transmission lines means of the radar chip.

2. An assembly as in claim 1, in which the radar chip is a radar transceiver chip, the assembly further comprising:
a signal processing integrated circuit chip for processing an output signal from the transceiver chip, the signal processing chip having a surface; and
coplanar microwave transmission line means formed on said surface of the signal processing chip;
the signal processing chip being mounted on the substrate with said surface of the signal processing chip facing said surface of the substrate, and the transmission line means of the signal processing chip being electrically interconnected with the transmission line means of the substrate.

3. An assembly as in claim 1, in which the radar chip is a radar transceiver chip, the assembly further comprising:
a power conditioning integrated circuit chip for supplying regulated electrical power to the transceiver chip, the power conditioning chip having a surface;
coplanar microwave transmission line means formed on said surface of the power conditioning chip;
the power conditioning chip being mounted on the substrate with said surface of the power conditioning chip facing said surface of the substrate, and the transmission line means of the power conditioning chip being electrically interconnected with the transmission line means of the substrate.

4. An assembly as in claim 1, in which:
the radar chip is a transceiver chip;
the substrate has a second surface which is opposite to said surface thereof;
the assembly further comprises:
a planar radar antenna means formed on the second surface of the substrate; and
interconnect means extending through the substrate and electrically interconnecting the transceiver chip with the antenna means.

5. An assembly as in claim 4, in which the interconnect means comprises at least one via.

6. An assembly as in claim 4, in which:
the antenna means comprises a transmitting antenna and a receiving antenna;
the interconnect means comprises a first via interconnecting the transceiver chip with the transmitting antenna, and a second via interconnecting the transceiver chip with the receiving antenna.

7. An assembly as in claim 1, in which the transmission line means of the radar chip is electrically interconnected with the transmission line means of the substrate by soldering.

8. An assembly as in claim 1, in which:
the transmission line means of the radar chip comprises a plurality of transmission lines, each including a signal conductor and a ground conductor;
the transmission line means of the substrate comprises ground conductor means;
the assembly further comprises a plurality of spacer means which electrically interconnect the ground conductors of the transmission lines of the radar chip with the ground conductor means of the substrate and maintain said surfaces of the radar chip and substrate spaced from each other by a predetermined distance.

9. An assembly as in claim 8, in which the spacer means are formed on the ground conductors of the radar chip, and electrically interconnected with the ground conductors of the substrate by soldering.

10. An assembly as in claim 8, in which the spacer means comprise bumps.

11. An assembly as in claim 8, in which said predetermined distance is at least approximately six times the spacing between the signal conductors and respective ground conductors of the transmission lines of the radar chip.

12. An assembly as in claim 1, in which:
the transmission line means of the radar chip comprises a plurality of transmission lines, each including a signal conductor and a ground conductor;
the assembly further comprises spacer means which maintain said surfaces of the radar chip and substrate spaced from each other by a predetermined distance;
said predetermined distance being at least approximately six times the spacing between the signal conductors and respective ground conductors of the transmission lines of the radar chip.

* * * * *